United States Patent
Grimm et al.

(10) Patent No.: US 7,377,974 B2
(45) Date of Patent: *May 27, 2008

(54) USE OF A PIGMENT PREPARATION BASED ON C.I. PIGMENT YELLOW 74

(75) Inventors: Felix W. Grimm, Hofheim (DE); Joerg Schueller, Bruehl (DE); Joachim Weber, Reinach (CH); Ulrike Rohr, Mannheim (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 26 days.

This patent is subject to a terminal disclaimer.

(21) Appl. No.: 10/582,770

(22) PCT Filed: Dec. 8, 2004

(86) PCT No.: PCT/EP2004/013945

§ 371 (c)(1),
(2), (4) Date: Jun. 12, 2006

(87) PCT Pub. No.: WO2005/056694

PCT Pub. Date: Jun. 23, 2005

(65) Prior Publication Data

US 2007/0125260 A1 Jun. 7, 2007

(30) Foreign Application Priority Data

Dec. 12, 2003 (DE) ............... 103 58 211

(51) Int. Cl.
- C09D 11/00 (2006.01)
- C09B 67/00 (2006.01)
- C09B 67/22 (2006.01)
- G03F 7/00 (2006.01)
- G03G 9/08 (2006.01)

(52) U.S. Cl. ............. 106/31.8; 106/31.6; 106/31.61; 106/496; 353/84; 430/7; 430/108.23; 524/159; 524/190

(58) Field of Classification Search ............... 106/31.6, 106/31.61, 31.8, 496, 712; 353/84; 430/7, 430/108.23; 524/159, 190
See application file for complete search history.

(56) References Cited

U.S. PATENT DOCUMENTS

| | | | |
|---|---|---|---|
| 3,759,733 | A | 9/1973 | Bradley et al. |
| 4,457,783 | A | 7/1984 | Hamilton et al. |
| 5,024,698 | A | 6/1991 | Schwartz et al. |
| 5,271,759 | A | 12/1993 | Wooden et al. |
| 6,503,317 | B1 | 1/2003 | Ortalano et al. |
| 6,504,045 | B2 | 1/2003 | Jung et al. |
| 6,918,958 | B2 | 7/2005 | Weber et al. |
| 2007/0128532 | A1* | 6/2007 | Grimm et al. ......... 430/108.23 |
| 2007/0169665 | A1* | 7/2007 | Schweikart et al. ....... 106/31.8 |

FOREIGN PATENT DOCUMENTS

| | | |
|---|---|---|
| DE | 2739775 | 3/1978 |
| DE | 4214868 | 11/1992 |
| EP | 1315588 | 6/2003 |
| GB | 1569837 | 6/1980 |
| GB | 2356634 | 5/2001 |
| GB | 2364322 | 1/2002 |
| JP | 45011026 | 4/1970 |
| JP | 10-158555 | 6/1998 |
| WO | WO 02/064680 | 8/2002 |

OTHER PUBLICATIONS

U.S. Appl. No. 10/582,769 by Grimm et al., filed Jun. 12, 2006.
U.S. Appl. No. 10/590,828 by Schweikart et al., filed Aug. 25, 2006.
U.S. Appl. No. 10/579,344, by Weber et al., filed May 12, 2006.
PCT International Search Report for PCT/EP 2004/013945, mailed Apr. 15, 2005.
English Translation of PCT Preliminary Report on Patentability for PCT/EP 2004/013945, mailed Dec. 8, 2004.
PCT International Search Report for PCT/EP 2004/013946, mailed Apr. 8, 2005.
English Abstract for JP 2000239594, Sep. 5, 2000.
English Translation of PCT International Preliminary Report on Patentability for PCT/EP 2004/013946, mailed Sep. 8, 2006.

* cited by examiner

Primary Examiner—Anthony J. Green
(74) Attorney, Agent, or Firm—Anthony A. Bisulca

(57) ABSTRACT

The invention relates to the use of pigment preparations comprising C.I. Pigment Yellow 74 as base pigment and one or more pigment dispersants of the formula (I)

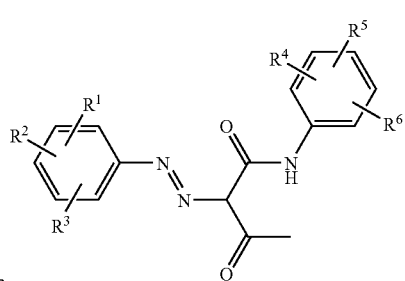

(1)

wherein
$R^1$, $R^2$, $R^3$, $R^4$, $R^5$, and $R^6$
independently represent hydrogen, halogen, such as chlorine or bromine, $C_1$-$C_4$ alkyl, such as methyl, ethyl or tert-butyl, $C_1$-$C_4$ alkoxy, such as methoxy or ethoxy, nitro, trifluoromethyl, cyano, phenyl, a group $SO_3^-E^+$- or $COO^-E^+$, provided that there is at least one and no more than two ionic groups of type $SO_3^-E^+$- or $COO^-E^+$ are supplied, one group being located in the coupling radical and the other being located in the base radical of the compound of the formula (I) in case two ionic groups are supplied, $E^+$ represents $H^+$, the equivalent $M^{m+}/m$ of a metal cation $M^{m+}$, m representing one of the numbers 1, 2, or 3 a phosphonium ion; or an unsubstituted or substituted ammonium ion, for pigmenting electrophotographic toners and developers, inks, aqueous binder systems, and color filters.

17 Claims, No Drawings

USE OF A PIGMENT PREPARATION BASED ON C.I. PIGMENT YELLOW 74

The present invention relates to new uses of monoazo pigment preparations based on C.I. Pigment Yellow 74.

U.S. Pat. No. 3,759,733 discloses pigment preparations comprising the coupling product of a diazotized aniline with an acetoacetylarylamide and comprising a water-soluble dye. The use of these pigment preparations in solvent-borne illustration gravure printing inks (decorative paints) is described, but not in other systems such as, for example, aqueous printing inks.

JP45-11026 likewise discloses pigment preparations comprising the coupling product of a diazotized aniline with an acetoacetylarylamide and comprising a water-soluble dye. The use of the pigment preparations is confined to nonaqueous systems.

Where pigment preparations are used for coloring high molecular weight organic materials, the requirements imposed on the performance properties of the pigments are exacting, such as high color strengths, high chromaticity (chroma) and good light fastness and weather fastness. When they are used in printing systems, requirements include high print transparency and low viscosity of the highly pigmented printing ink concentrates during dispersing. Similar requirements are imposed when they are used in electrophotographic toners, inkjet inks, color filters or electronic inks. Here there are also specific requirements, such as appropriate triboelectric properties, for example.

The known monoazo pigment preparations based on C.I. Pigment Yellow 74 do not satisfy all present-day requirements. Consequently there was a need for improvement, and the object was to find pigment preparations which, when used in the applications referred to above, exhibit properties superior to those of the existing preparations.

It has been found that the object is surprisingly achieved through the use of the pigment preparation defined below.

The invention provides for the use of pigment preparations comprising C.I. Pigment Yellow 74 as base pigment and one or more pigment dispersants of the formula (I)

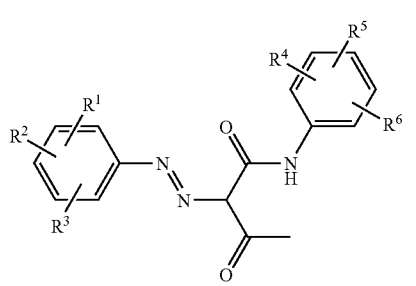

(1)

in which $R^1$, $R^2$, $R^3$, $R^4$, $R^5$, and $R^6$ independently of one another are hydrogen, halogen, such as chlorine or bromine, $C_1$-$C_4$ alkyl, such as methyl, ethyl or tert-butyl, $C_1$-$C_4$ alkoxy, such as methoxy or ethoxy, nitro, trifluoromethyl, cyano, phenyl, a group $SO_3^{-E+}$- or $COO^-E^+$, with the proviso that there is at least one and not more than two ionic groups of type $SO_3^-E^+$- or $COO^-E^+$, and that, in the case of two ionic groups, one group is located in the coupler residue and the other in the base residue of the compound of the formula (I);

the equivalent $M^{m+}/m$ of a metal cation $M^{m+}$, preferably from main group 1 to 5 or from transition group 1 or 2 or 4 to 8 of the Periodic Table of the Chemical Elements, m being the number 1, 2 or 3, such as $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Co^{2+}$, $Zn^{2+}$, $Fe^{2+}$, $Al^{3+}$, $Cr^{3+}$ or $Fe^{3+}$, for example; a phosphonium ion; or an unsubstituted or substituted ammonium ion; for pigmenting electrophotographic toners and developers, inks, aqueous binder systems, and color filters.

Preferably $R^1$, $R^2$, $R^3$, $R^4$, $R^5$, and $R^6$ are hydrogen, chlorine, methyl, trifluoromethyl or methoxy, and preferably the pigment dispersant carries an ionic group $SO_3^-E^+$.

A suitable substituted ammonium ion is for example an ion of the formula $$N^+R^9R^{10}R^{11}R^{12}$$

where $R^9$, $R^{10}$, $R^{11}$ and $R^{12}$ are identical or different and have the definition hydrogen, hydroxyl, amino, phenyl, ($C_1$-$C_4$)-alkylene-phenyl, $C_5$-$C_{30}$ cycloalkyl, $C_2$-$C_{30}$ alkenyl, or branched or unbranched $C_1$-$C_{30}$ alkyl, it being possible for the phenyl ring, the ($C_1$-$C_4$)-alkylene-phenyl group, the $C_5$-$C_{30}$ cycloalkyl group, the $C_2$-$C_{30}$ alkenyl group, and the $C_1$-$C_{30}$ alkyl group to be substituted by one or more substituents, e.g., 1, 2, 3 or 4 substituents, from the group of Cl, Br, CN, $NH_2$, OH, $C_6H_5$, $C_6H_5$ substituted by 1, 2 or 3 $C_1$-$C_{20}$ alkoxy radicals, carbamoyl, carboxyl, $C_2$-$C_4$ acyl, $C_1$-$C_8$ alkyl, $NR^7R^8$, $R^7$ and $R^8$ being as defined below, and $C_1$-$C_4$ alkoxy, methoxy or ethoxy for example, or for the alkyl group and the alkenyl group to be perfluorinated or partly fluorinated;

or have the definition of a radical of the formula (Ib)

$$—[X—Y]_h—R^8 \quad (Ib)$$

in which h is a number from 0 to 100, preferably 0 to 20, with particular preference 0, 1, 2, 3, 4 or 5;

X is a $C_2$-$C_6$ alkylene radical, a $C_5$-$C_7$ cycloalkylene radical, or a combination of these radicals, it being possible for these radicals to be substituted by 1 to 4 $C_1$-$C_4$ alkyl radicals, hydroxyl radicals, $C_1$-$C_4$ alkoxy radicals, ($C_1$-$C_4$)-hydroxyalkyl radicals and/or by 1 to 2 further $C_5$-$C_7$ cycloalkyl radicals, or in which X, if h is >1, can also be a combination of the stated definitions;

Y is an —O— or

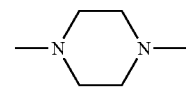

group or a group —$NR^7$—, or in which Y, if h is >1, can also be a combination of the stated definitions;

$R^7$ and $R^8$ independently of one another are a hydrogen atom, a substituted or unsubstituted, or partly fluorinated or perfluorinated, branched or unbranched $C_1$-$C_{20}$ alkyl group, a substituted or unsubstituted $C_5$-$C_8$ cycloalkyl group or a substituted or unsubstituted, or partly fluorinated or perfluorinated, $C_2$-$C_{20}$ alkenyl group, it being possible for the substituents to be hydroxyl, phenyl, cyano, chlorine, bromine, amino, $C_2$-$C_4$ acyl or $C_1$-$C_4$ alkoxy and to be preferably 1 to 4 in number, or R⁷ and R⁸ together with the nitrogen atom of the NR⁷ group form a saturated, unsaturated or aromatic heterocyclic 5- to 7-membered ring which if desired contains 1 or 2 further nitrogen, oxygen or sulfur atoms or carbonyl groups in the ring, is substituted if desired by 1, 2 or 3 radicals from the group of OH, $NH_2$, phenyl, CN, Cl, Br, $C_1$-$C_4$ alkyl, $C_1$-$C_4$ alkoxy, $C_2$-$C_4$ acyl, and carbamoyl, and which if desired carries 1 or 2 benzo-fused saturated, unsaturated or aromatic, carbocyclic or heterocyclic rings;

or where $R^9$ and $R_{10}$ together with the nitrogen atom of the ammonium ion may form a five- to seven-membered saturated or unsaturated ring system, which if desired additionally contains further heteroatoms from the group of O, S, and N or carbonyl groups, and which if desired carries 1 or 2 fused-on saturated, unsaturated or aromatic, carbocyclic or heterocyclic rings;

where the ring system and the fused-on rings, where appropriate, can be substituted by 1, 2 or 3 radicals from the group of OH, $NH_2$, phenyl, CN, Cl, Br, $C_1$-$C_4$ alkyl, $C_1$-$C_4$ alkoxy, $C_2$-$C_4$ acyl, and carbamoyl, of, for example, the pyrrolidone, imidazolidine, hexamethyleneimine, piperidine, piperazine or morpholine type;

or where $R^9$, $R^{10}$, and $R^{11}$ together with the nitrogen atom of the ammonium ion form a five- to seven-membered aromatic ring system, which if desired also contains further heteroatoms from the group of O, S, and N or carbonyl groups, and which if desired carries 1 or 2 fused-on saturated, unsaturated or aromatic, carbocyclic or heterocyclic rings, it being possible for the ring system and the fused-on rings, where appropriate, to be substituted by 1, 2 or 3 radicals from the group of OH, $NH_2$, phenyl, CN, Cl, Br, $C_1$-$C_4$ alkyl, $C_1$-$C_4$ alkoxy, $C_2$-$C_4$ acyl, and carbamoyl, of, for example, the pyrrole, imidazole, pyridine, picoline, pyrazine, quinoline or isoquinoline type.

A further suitable substituted ammonium is the 1/p equivalent of an ammonium ion of the formula (Ic)

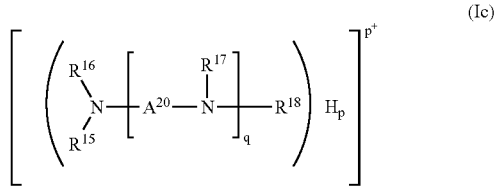

in which $R^{15}$, $R^{16}$, $R^{17}$ and $R^{18}$ independently of one another are hydrogen or a (poly)alkyleneoxy group of the formula (Id);

in which j is the number 2 or 3, k is a number from 1 to 100, the radical $R^{80}$ is hydrogen, $C_1$-$C_4$ alkyl or, if k is >1, a combination thereof, and the radical $R^{81}$ is hydrogen, $C_1$-$C_4$ alkyl or the group —$(CH(R^{82})$—$)_iNH_2$, i is the number 2 or 3, and the radical $R^{82}$ is hydrogen, $C_1$-$C_4$ alkyl or a combination thereof;

q is a number from 1 to 10, preferably 1, 2, 3, 4 or 5;

p is a number from 1 to 5, with p being ≦q+1;

$A^{20}$ is a branched or unbranched $C_2$-$C_6$ alkylene radical; or in which $A^{20}$, if q is >1, can also be a combination of branched or unbranched $C_2$-$C_6$ alkylene radicals.

As further suitable substituted ammonium ion is an ammonium ion deriving from a polyaminoamido or polyamino compound and having a fraction of reactive polyamino groups such that the amine index is between 100 and 800 mg of KOH per g of the polyaminoamido or polyamino compound, as is disclosed in, for example, DE-A-27 39 775.

A further suitable substituted ammonium ion is a cation of a polymeric ammonium salt having an average molecular weight of 500 to 2 500 000 which is soluble in water or in $C_1$-$C_4$ alcohol, as is disclosed in, for example, DE-A-4 214 868.

A further suitable substituted ammonium ion is the 1/r equivalent of a diamine-derived ammonium ion of the formula (III)

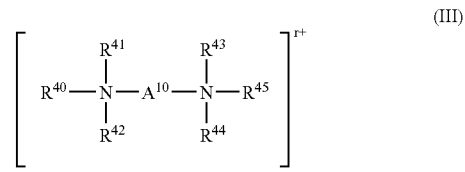

as disclosed in, for example, WO 01/14479, and in which $R^{40}$ is $C_6$-$C_{30}$ alkyl, preferably linear $C_8$-$C_{20}$ alkyl, or $C_6$-$C_{30}$ alkenyl, preferably linear, $R^{41}$ is a free valence, hydrogen, $C_1$-$C_{30}$ alkyl, $C_2$-$C_{30}$ alkenyl, $C_3$-$C_{30}$ cycloalkyl, $C_6$-$C_{14}$ aryl or $C_7$-$C_{38}$ aralkyl, $R^{42}$, $R^{43}$, and $R^{45}$ are identical or different and are $C_1$-$C_6$ alkyl, preferably methyl, $C_3$-$C_{30}$ cycloalkyl, $C_6$-$C_{14}$ aryl or $C_7$-$C_{38}$ aralkyl, $R^{44}$ is a free valence, hydrogen, $C_1$-$C_6$ alkyl, preferably methyl, $C_3$-$C_{30}$ cycloalkyl, $C_6$-$C_{14}$ aryl or $C_7$-$C_{38}$ aralkyl, with the proviso that $R^{41}$ and $R^{44}$ are not simultaneously a free valence, r is the number 2, or, if $R^{41}$ or $R^{44}$ is a free valence, is the number 1, $A^{10}$ is $C_1$-$C_{12}$ alkylene or $C_2$-$C_{14}$ alkenylene, contains preferably 2, 3 or 4 carbon atoms, especially 3;

or $R^{41}$ and $R^{43}$ together with the two nitrogen atoms to which they are linked and with $A^{10}$ form a ring, preferably of piperazinyl;

and/or $R^{44}$ and $R^{45}$ together with the nitrogen atom to which they are linked form a ring, preferably piperidinyl, morpholinyl, piperazinyl or N—($C_1$-$C_6$ alkyl)piperazinyl.

The radicals stated in the definition of $R^{40}$ to $R^{45}$ are preferably unsubstituted or are substituted by substituents from the group of OH, $C_1$-$C_6$ alkyl, preferably methyl, $C_1$-$C_6$ alkoxy, CN, and halogen, especially chlorine or bromine. Aryl is preferably phenyl, aralkyl is preferably benzyl or 2-phenylethyl, and cycloalkyl is preferably cyclopentyl or cyclohexyl.

Preferred ions of the formula III) are those in which $R^{41}$ and $R^{44}$ are hydrogen and $R^{42}$, $R^{43}$ and $R^{45}$ are methyl, with particular preference those in which $R^{41}$ to $R^{45}$ are methyl. Preference is given additionally to those ions of the formula (III) which derive from amines of natural oils and fats, such as coconut oil, corn oil, cereal oil, fish oil or whale oil, especially from tallow.

Additionally of particular interest are pigment dispersants of the formula (I) in which E⁺ has the definition H⁺;

or where, in the case of the equivalent $M^{m+}/m$, the metal cation $M^{m+}$ has the definition $Na^+$, $Ca^{2+}$, $Mg^{2+}$, $Sr^{2+}$, $Ba^{2+}$, $Mn^{2+}$ or $Al^{3+}$;

or where E⁺ is a protonated tertiary amine obtained from oils and fats such as tallow, coconut oil, corn oil, cereal oil, fish oil or whale oil, and is for example triisooctylamine, dimethyltalllowamine, dimethylsoyaamine, dimethyloctadecylamine or hydrogenated monomethyl-di(tallowamine) or an alkoxylated derivative of a fatty amine, such as tallowalkyldi(2-hydroxyethyl)amine polyoxyethylene (5)tallowamine, polyoxyethylene(8)oleylamine, N,N',N'-tris(2-hydroxyethyl)-N-tallow-1,3-diaminopropane, N,N', N'-polyoxyethylene(12)-N-tallow-1,3-diaminopropane;

or where E⁺ is a quaternary ammonium ion derived preferably from the alkoxylated fatty amines or amines obtained from above oils and fats, such as by methylation or by reaction with benzyl chloride, for example, and is for example stearylbenzyl- or cocoalkyl-dimethyl-benzylammonium or -2,4-dichlorobenzylammonium, hexadecyl-, stearyl-, dodecyl- or cetyltrimethylammonium, di-hydrogenated tallowalkyl-, dicocoalkyl- or distearyldimethylammonium, oleyl- or coco-di(2-hydroxyethyl)methylammonium, hydrogenated polyoxyethylene(15)tallow-methylammonium, N,N,N',N',N'-pentamethyl-N-tallow-1,3-propanediammonium, permethylated N-stearyidiethylenetriamine, permethylated N-stearyltriethylenetetramine, N-(3-dodecyloxy-2-hydroxypropyl) octadecyldimethylammonium, methyltri(2-octyl)ammonium, N,N-di(beta-stearoylethyl)-N,N-dimethylammonium, laurylpyridinium, 2-hydroxy-[5-chloro-, 5-isooctyl, 5-t-butyl- or n-nonyl-]1,3-xylylene-bispyridinium, 2-methoxy-5-isooctyl-1,3-xylylene-bispyridinium, 2-hydroxy-5-isooctyl-1,3-xylylene-bisquinolinium, 2-hydroxy-5-isooctyl-1,3-xylylene-bisisoquinolinium or behenyltrimethylammonium;

or where E⁺ is a phosphonium ion such as hexadecyltributylphosphonium, ethyltrioctylphosphonium or tetrabutylphosphonium;

it being possible for the original anions of the quaternary ammonium compounds or phosphonium compounds used to have been, for example halide, sulfate, alkoxysulfate or alkoxyphosphate.

Additionally of particular interest are pigment dispersants of the formula (I) in which the parent amine of the ammonium ion $N^+R^9R^{10}R^{11}R^{12}$ is a primary or secondary amine, especially mixtures of primary and secondary amines with optionally mixed hydrocarbon radicals of naturally occurring oils and fats such as tallow, coconut oil, corn oil, cereal oil, fish oil or whale oil or wood resin; specific examples include ammonia, methylamine, triethylamine, butylamines, dibutylamines, tributylamine, hexylamines, dodecylamine, stearylamine, diethylamine, di-n-butylamine, ethylenediamine, aniline, N-methylaniline, benzylamine, phenylethylamine, cyclohexylaminoethylamine, 2-cyclohexylaminopropylamine, 3-stearylaminopropylamine, 2-dimethylaminoethylamine, 2-diethylaminoethylamine, 2-dipropylaminoethylamine, 2-dibutylaminoethylamine, 3-dimethylaminopropylamine, 3-diethylaminopropylamine, 3-cyclohexylaminopropylamine, N-methylpiperazine, N-aminopropylmorpholine, N-aminoethylpiperidine, N-aminoethylpyrrolidine, N-aminopropylpipecoline, 4-diethylamino-1-methylbutyl-1-amine, laurylamine, cocoamine or tallowamine, lauryl-, oleyl- or tallowpropylenediamine, tallow-dipropylenetriamine, tallowtripropylenetetraamine, 1,1,3,3-tetramethylbutylamine, primary amines with tertiary $C_{16}$-$C_{22}$ alkyl groups, N,N-bisaminopropyltallowamine, 2-ethylhexoxypropylamine or dehydroabietylamine.

Preference is given to using one or more pigment dispersants of the formula (IV)

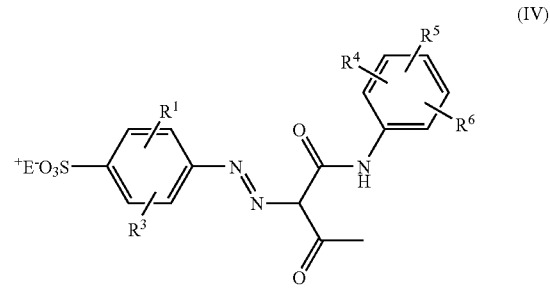

and of the formula (V)

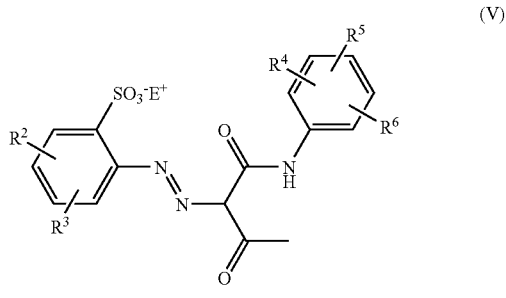

where $R^1$, $R^2$, $R^3$, $R^4$, $R^5$, $R^6$, and E⁺ are as defined above.

Pigment dispersants of the formula (I) that are used are, in particular, those from the group of C.I. Pigment Yellow 61, 61:1, 62, 62:1, 168, 169, and 191:1.

The pigment dispersants of the formula (I) can be present in the corresponding tautomeric forms, and hence the formulae (I), (IV), and (V) also encompass the tautomeric forms.

Preferred pigment preparations for the purposes of the present invention contain a) 50% to 99.9%, preferably 60% to 99.5%, with particular preference 65% to 99% by weight of Pigment Yellow 74, b) 0.1% to 25%, preferably 0.5% to 15%, with particular preference 1% to 10% by weight of 1, 2, 3, 4, 5 or 6, preferably 1, 2, 3 or 4, in particular 1 or 2, pigment dispersants of the formula (I), c) 0 to 25%, preferably 0 to 15% by weight of auxiliaries, the fractions of the respective components being based on the total weight of the preparation (100% by weight).

Examples of suitable auxiliaries include surfactants, nonpigmentary and pigmentary dispersants, fillers, standardizers, resins, waxes, defoamers, antidust agents, extenders, antistats, shading colorants, preservatives, drying retarders, rheology control additives, wetting agents, antioxidants, UV absorbers, light stabilizers, or a combination thereof. Shading components are typically used in amounts up to 10% by weight and auxiliaries in amounts up to 40% by weight, based in each case on the total amount of the C.I. Pigment Yellow 74 used in accordance with the invention. In exceptional cases, however, larger amounts may also be present.

The pigment preparation of the invention can be prepared by a variety of processes: for example, by contacting the base pigment and the pigment dispersant with one another after separate synthesis, or by synthesizing the pigment dispersant and the base pigment together.

The pigment dispersants of the formula (I) and C.I. Pigment Yellow 74 are known compounds which can be prepared by processes known to the skilled worker, by means of azo coupling, in which a corresponding amine is diazotized and coupled to the corresponding acetoacetanilide coupler. In the case of the pigment dispersant of the formula (I) the free acid or a relatively readily soluble salt of the pigment dispersant is commonly prepared by azo coupling and if desired is subsequently laked to form a more sparingly soluble salt. Since laking need not proceed to completion, it is possible for there to be two or more different pigment dispersants of the formula (I) in the pigment preparation.

The addition of the pigment dispersant to the base pigment can take place at any point in the preparation process of the base pigment and in a variety of forms: for example, the pigment dispersant can be added as a suspension or as a water-moist presscake to the suspension of the base pigment; the water-moist presscakes of the base pigment and of the pigment dispersant can be mixed in corresponding apparatus, or they are mixed with one another in dry form, such as in the form of granules or powders, for example. Addition of the pigment dispersant before the base pigment is isolated, for example, may also take place before or after the base pigment suspension has been subjected to a thermal treatment.

In the case of the joint synthesis, the azo couplings may in principle take place batchwise, directly or indirectly, i.e., by adding the diazonium salt to the coupler or vice versa, or else it is possible to select a continuous procedure, through the use of a mixing nozzle, a microreactor or a microjet reactor, with simultaneous, continuous feeding of the diazonium salt and of the coupling component. Both the diazonium salt and the coupling component can be used in solution or as a suspension, and in the case of indirect coupling the use of the coupling component in solid form is a further possibility.

The amine components of the base pigment and of the pigment dispersant can be diazotized together or separately. In the case of direct coupling, the diazonium salts can be added separately or as a mixture, together, or in the case of indirect coupling they can be introduced together as an initial charge. In the case of direct coupling, the coupling components of the base pigment and of the pigment dispersant can be present together or, in the case of indirect coupling, they can be added together or separately.

It is also possible first to prepare one component (base pigment or pigment dispersant) and to carry out the azo coupling of the second component in the presence of the suspension of the first component.

The base pigment is preferably prepared by direct coupling, by adding the diazonium salt in solution or suspension form to the freshly precipitated suspension of the coupling component, and the pigment dispersant is added as a moist presscake or as a dry powder to the ready-prepared coupling suspension of the base pigment.

Pigment preparations with two or more, for example, up to 6, preferably up to 4 pigment dispersants are also possible.

Converting the pigment dispersant from a more readily soluble form, the sodium salt for example, into a more sparingly soluble form, the calcium salt or an amine salt for example, is commonly accomplished by adding the corresponding nitrogen-containing compounds or inorganic salts after the more readily soluble form of the pigment dispersant has been prepared by azo coupling.

It can be advantageous to carry out the coupling in the presence of customary coupling promoters, such as long-chain amine oxides and phosphine oxides, for example.

Couplings in aqueous-organic or purely organic media may also be employed for the preparation of the coupling products.

The process parameters that are essential in azo coupling, such as time, temperature, pH, use of buffers, solvents or surfactants, for example, are known to the skilled worker from the literature.

In order to achieve the desired performance properties, and particularly the coloristic properties, it may be necessary to subject the coupling suspension of the base pigment to a heat treatment prior to final isolation, and this can be carried out in the presence or absence of the pigment dispersant. For this purpose the isolated, moist presscake of the prepigment can also be dispersed again in a liquid medium. Suitable liquid media, besides the coupling liquor and water, also include organic solvents or a mixture of water and organic solvent, in which case the water and the organic solvent need not be fully miscible with one another either at room temperature or at any other temperature, in order to produce an application-specific crystal polymorph and/or crystal morphology and/or particle size distribution. In the case of the heat treatment, temperatures of 50 to 200° C., for example, may occur. Suitable organic solvent includes the following: alcohols having 1 to 10 carbon atoms, glycols, polyglycols, ethers, glycol ethers, polyethylene glycol monomethyl ether, polyethylene glycol dimethyl ether, ketones, aliphatic acid amides, urea derivatives, cyclic carboxamides, nitriles, aliphatic or aromatic amines, optionally halogenated aliphatic hydrocarbons, optionally alkyl-, alkoxy-, nitro-, cyano- or halogen-substituted aromatic hydrocarbons, aromatic heterocycles, sulfones and sulfoxides, and mixtures of these organic solvents. Preferred solvents are $C_1$-$C_6$ alcohols, especially methanol, ethanol, n- and isopropanol, isobutanol, n- and tert-butanol, and tert-amyl alcohol; $C_3$-$C_6$ ketones, especially acetone, methyl ethyl ketone or diethyl ketone; tetrahydrofuran, dioxane, ethylene glycol, diethylene glycol or ethylene glycol $C_3$-$C_5$ alkyl ethers, especially 2-methoxyethanol, 2-ethoxyethanol, butyl glycol, toluene, xylene, ethylbenzene, chlorobenzene, o-dichlorobenzene, N,N-dimethylacetamide, N-methylpyrrolidone, dimethyl sulfoxide or sulfolane.

Auxiliaries may be added at any desired point in time, all at once or in two or more portions. They may be added, for example, just before the coupling, prior to finishing, or only after finishing, or else by mixing in the dry state.

Suitable surfactants include anionic, or anion-active, cationic, or cation-active, and nonionic or amphoteric substances, or mixtures of these agents.

Examples of suitable anionic substances include fatty acid taurides, fatty acid N-methyltaurides, fatty acid isethionates, alkylphenylsulfonates, examples being dodecylbenzenesulfonic acid, alkylnaphthalenesulfonates, alkylphenol polyglycol ether sulfates, fatty alcohol polyglycol ether sulfates, fatty acid amide polyglycol ether sulfates, alkylsulfosuccinamates, alkenylsuccinic monoesters, fatty alcohol polyglycol ether sulfosuccinates, alkanesulfonates, fatty acid glutamates, alkylsulfosuccinates, fatty acid sarcosides; fatty acids, examples being palmitic, stearic and oleic acid; the salts of these anionic substances and soaps, examples being alkali metal salts of fatty acids, naphthenic acids and resin acids, abietic acid for example, alkali-soluble resins, rosin-modified maleate resins for example, and condensation products based on cyanuric chloride, taurine, N,N'-diethylaminopropylamine and p-phenylenediamine. Preference is given to resin soaps, i.e., alkali metal salts of resin acids.

Examples of suitable cationic substances include quaternary ammonium salts, fatty amine oxalkylates, polyoxyalkyleneamines, oxalkylated polyamines, fatty amine polyglycol ethers, primary, secondary or tertiary amines, examples being alkyl amines, cycloalkylamines or cyclized alkylamines, especially fatty amines, diamines and polyamines derived from fatty amines or fatty alcohols, and the oxalkylates of said amines, imidazolines derived from fatty acids, polyaminoamido or polyamino compounds or resins having an amine index of between 100 and 800 mg of KOH per g of the polyaminoamido or polyamino compound, and salts of these cationic substances, such as acetates or chlorides, for example.

Examples of suitable nonionic and amphoteric substances include fatty amine carboxyglycinates, amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers, fatty acid amide ethoxylates, fatty alcohol-alkylene oxide adducts and alkylphenyl polyglycol ethers.

By nonpigmentary dispersants are meant substances which structurally are not derived from organic pigments. They are added as dispersants either during the actual preparation of pigments, but often, also, during the incorporation of the pigments into the application media that are to be colored: for example, during the preparation of varnishes or printing inks, by dispersing the pigments into the corresponding binders. They may be polymeric substances, examples being polyolefins, polyesters, polyethers, polyamides, polyimines, polyacrylates, polyisocyanates, block copolymers thereof, copolymers of the corresponding monomers, or polymers of one class modified with a few monomers from a different class. These polymeric substances carry polar anchor groups such as, for example, hydroxyl, amino, imino and ammonium groups, carboxylic acid and carboxylate groups, sulfonic acid and sulfonate groups or phosphonic acid and phosphonate groups, and may also have been modified with aromatic, nonpigmentary substances. Nonpigmentary dispersants may additionally also be aromatic substances modified chemically with functional groups and not derived from organic pigments. Nonpigmentary dispersants of this kind are known to the skilled worker and in some cases are available commercially (e.g., Solsperse®, Avecia; Disperbyk®, Byk-Chemie; Efka®, Efka). A number of types will be named below, by way of representation, although in principle any desired other substances described can be employed, examples being condensation products of isocyanates and alcohols, diols or polyols, amino alcohols or diamines or polyamines, polymers of hydroxycarboxylic acids, copolymers of olefin monomers or vinyl monomers and ethylenically unsaturated carboxylic acids and carboxylic esters, urethane-containing polymers of ethylenically unsaturated monomers, urethane-modified polyesters, condensation products based on cyanuric halides, polymers containing nitroxyl compounds, polyester amides, modified polyamides, modified acrylic polymers, dispersants with a comblike structure comprising polyesters and acrylic polymers, phosphoric esters, triazine-derived polymers, modified polyethers, or dispersants derived from aromatic, nonpigmentary substances. These parent structures are in many cases modified further, by means for example of chemical reaction with further substances carrying functional groups, or by means of salt formation.

By pigmentary dispersants are meant pigment dispersants which derive from an organic pigment parent structure and are prepared by chemically modifying said parent structure, examples being saccharine-containing pigment dispersants, piperidyl-containing pigment dispersants, naphthalene- or perylene-derived pigment dispersants, pigment dispersants having functional groups which are attached to the pigment parent structure via a methylene group, pigment parent structures chemically modified with polymers, pigment dispersants containing sulfo acid, sulfonamide or sulfo acid ester groups, pigment dispersants containing ether or thioether groups, or pigment dispersants containing carboxylic acid, carboxylic ester or carboxamide groups.

Anionic groups of the nonpigmentary and pigmentary dispersants, surfactants or resins used as auxiliaries may also be laked, using for example Ca, Mg, Ba, Sr, Mn or Al ions or using quaternary ammonium ions. This may be done before or after the finishing By fillers and/or extenders are meant a multiplicity of substances in accordance with DIN 55943 and DIN EN 971-1, examples being the various types of talc, kaolin, mica, dolomite, lime, barium sulfate or titanium dioxide. In this context it has proven particularly appropriate to make the addition before the pulverization of the dried pigment preparation.

The pigment preparation of the invention can be employed as a preferably aqueous presscake or as moist granules, but generally comprises solid systems of free-flowing, pulverulent nature, or granules.

The pigment preparations of the invention can be employed for pigmenting aqueous binder systems, such as aqueous varnish systems, aqueous paints, and, in particular, aqueous printing ink systems, and also of newer coloring systems, such as electrophotographic toners and developers, inks, especially ink-jet inks, electret materials, color filters, and powder coating materials.

These systems comprise high molecular weight organic materials; based on the high molecular weight organic material to be pigmented, the pigment preparations of the invention are employed in an amount of 0.05 to 30% by weight, preferably 0.1% to 15% by weight.

Aqueous binder systems in the sense of the invention comprise water and/or are dilutable with water.

Aqueous binder systems comprise high molecular weight organic materials which can be pigmented with the pigment compositions of the invention; these are, for example, cellulose compounds, such as, for example, cellulose ethers and cellulose esters, such as ethylcellulose, nitrocellulose, cellulose acetates or cellulose butyrates, natural binders, such as, for example, synthetic resins, such as, for example, polycondensates, polyadducts, addition polymers and copolymers, such as, for example, amino resins, especially urea- and melamine formaldehyde resins, alkyd resins, acrylic resins, urea resins, polyvinyls, such as polyvinyl alcohols, polyvinyl acetals, polyvinyl acetates or polyvinyl ether, polycarbonates, polyolefins, such as polystyrene, polyvinyl chloride, polyethylene or polypropylene, poly (meth)acrylates and copolymers thereof, such as polyacrylic esters or polyacrylonitriles, polyamides, polyesters, polyurethanes, epoxy resins, unsaturated synthetic resins (polyesters, acrylates) with the different cure mechanisms, waxes, casein, silicones and silicone resins; individually or in mixtures.

It is unimportant whether the aforementioned high molecular weight organic compounds are present in the form of solutions or dispersions. Depending on the intended use it proves advantageous to utilize the pigment preparations of the invention in the form of a blend or in the form of prepared products or dispersions.

The pigment preparations of the invention are also suitable for use as colorants in electrophotographic toners and developers, such as, for example, one- or two-component powder toners (also called one- or two-component developers), magnetic toners, liquid toners, latex toners, polymerization toners, and specialty toners.

Typical toner binders are addition-polymerization resins, polyaddition resins and polycondensation resins, such as styrene, styrene-acrylate, styrene-butadiene, acrylate, polyester, phenolic-epoxy resins, polysulfones, polyurethanes, individually or in combination, and also polyethylene and polypropylene, which may also include further ingredients, such as charge control agents, waxes or flow assistants, or may be modified subsequently with these added ingredients.

The pigment preparations of the invention are additionally suitable for use as colorants in powder coating materials, particularly in triboelectrically or electrokinetically sprayable powder coating materials which are employed to coat the surfaces of articles made, for example, from metal, wood, plastic, glass, ceramic, concrete, textile material, paper or rubber.

As powder coating resins use is made typically of epoxy resins, carboxyl- and hydroxyl-containing polyester resins, polyurethane resins, and acrylic resins, together with customary hardeners. Combinations of resins are also employed. For example, epoxy resins are frequently used in combination with carboxyl- and hydroxyl-containing polyester resins. Typical hardener components (depending on the resin system) are, for example, acid anhydrides, imidazoles, and also dicyandiamide and the derivatives thereof, masked isocyanates, bisacylurethanes, phenolic resins and melamine resins, triglycidyl isocyanurates, oxazolines, and dicarboxylic acids.

The invention further provides for the use of the described pigment preparation as a colorant for printing inks, particularly for ink-jet inks.

By ink-jet inks are meant not only aqueous inks (including microemulsion inks) but also nonaqueous ("solvent-based") inks, UV-curable inks, and inks which operate in accordance with the hot-melt process.

Solvent-based ink-jet inks contain essentially 0.5 to 30% by weight, preferably 1% to 15% by weight, of the pigment preparation of the invention, 70% to 95% by weight of an organic solvent or solvent mixture and/or of a hydrotropic compound. Where appropriate, the solvent-based ink-jet inks may comprise carrier materials and binders which are soluble in the "solvent" such as polyolefins, natural and synthetic rubber, polyvinyl chloride, vinyl chloride/vinyl acetate copolymers, polyvinyl butyrals, wax/latex systems or combinations of these compounds. The solvent-based ink-jet inks may further comprise, where appropriate, additional additives, such as wetting agents, degassing/defoaming agents, preservatives, and antioxidants, for example.

Microemulsion inks are based on organic solvents, water, and, optionally, an additional substance that acts as an interface mediator (surfactant). Microemulsion inks contain 0.5% to 30% by weight, preferably 1% to 15% by weight, of the pigment preparation of the invention, 0.5% to 95% by weight of water, and 0.5% to 95% by weight of organic solvents and/or interface mediators.

UV-curable inks contain essentially 0.5% to 30% by weight of the pigment preparation of the invention, 0.5% to 95% by weight of water, 0.5% to 95% by weight of an organic solvent or solvent mixture, 0.5 to 50% by weight of irradiation-curable binder, and, if desired, 0 to 10% by weight of a photoinitiator. Hot-melt inks are based usually on waxes, fatty acids, fatty alcohols or sulfonamides which are solid at room temperature and liquefy on heating, the preferred melting range being between about 60 and about 140° C. Hot-melt ink-jet inks are composed essentially of 20% to 90% by weight of wax and 1% to 10% by weight of the pigment preparation of the invention. They may further include 0 to 20% by weight of an additional polymer (as "dye dissolver"), 0 to 5% by weight of dispersant, 0 to 20% by weight of viscosity modifier, 0 to 20% by weight of plasticizer, 0 to 10% by weight of tack additive, 0 to 10% by weight of transparency stabilizer (which prevents, for example, crystallization of the wax), and 0 to 2% by weight of antioxidant.

The printing inks of the invention, especially ink-jet inks, can be prepared by dispersing the colorant preparations into the microemulsion medium or into the nonaqueous medium or into the medium for preparing the UV-curable ink or into the wax for preparing a hot-melt ink-jet ink.

It is appropriate to carry out subsequent filtration of the resultant printing inks for ink-jet applications (via a 1 μm filter, for example).

Additionally the pigment preparations of the invention are also-suitable for use as. colorants for color filters, both for additive and for subtractive color generation, and also as colorants for electronic inks (or e-inks) or electronic paper (e-paper). In the production of what are known as color filters, both reflective and transparent color filters, pigments are applied in the form of a paste or as pigmented photoresists in suitable binders (acrylates, acrylic esters, polyimides, polyvinyl alcohols, epoxides, polyesters, melamines, gelatins, caseins) to the respective LCD components (e.g., TFT-LCD—Thin Film Transistor Liquid Crystal Displays or, e.g., (S) TN-LCD—(Super) Twisted Nematic-LCD). Besides high thermal stability, high pigment purity is a prerequisite for a stable paste and/or a pigmented photoresist. Furthermore, the pigmented color filters can also be applied by ink-jet printing processes or other suitable printing processes.

It was surprising and unforeseeable that the pigment preparations of the invention, when used in aqueous printing ink systems and the newer coloring systems, lead to good results.

In order to assess the properties of the pigment preparations in the printing sector a selection was made, from among the multiplicity of known aqueous printing systems, of an aqueous, acrylic resin-based flexographic printing system (FP).

In order to assess the suitability of the pigment preparations for use in the production of electrophotographic toners, their dispersibility in aqueous systems was tested. For this purpose an aqueous, polyvinyl acetate (PVA)-based white emulsion paint was selected. The pigment preparation is stirred in the form of an aqueous dispersion into this PVA system. The aqueous dispersion is composed of 17% by weight pigment preparation, 1.5% by weight anionic dispersant (e.g., sulfate or sulfonate), and 81.5% by weight water, and is prepared by bead milling using ceramic beads having a diameter of 0.4 to 0.6 mm.

The color strength and the chroma were determined in accordance with DIN 5033, DIN 55986, and DIN 53235.

The viscosity was determined after the millbase had been diluted to the final pigment concentration, using the Rossmann viscospatula, type 301 from Erichsen. The viscosity of the printing inks was measured by means of a rotation viscometer. Gloss measurements were carried out on cast films at an angle of 20° in accordance with DIN 67530 (ASTMD 523) using the multigloss gloss meter from Byk-Mallinckrodt.

In the examples below, parts and percentages are each by weight.

EXAMPLE 1 a) Diazo Component 84 parts of 5-nitro-2-aminoanisole are suspended in 210 parts of water and 132.2 parts of 31% hydrochloric acid. The suspension is cooled to 0° C. with 420 parts of an ice/water mixture and diazotized by addition of 85.2 parts of 40% strength sodium nitrite solution.

b) Coupler 1345 parts of water and 104 parts of 25% strength sodium hydroxide solution are used to dissolve 103.5 parts of acetoacetyl-o-anisidide. Following the addition of 3.5 parts of a 20% strength aqueous solution of sodium lauryl sulfate, the solution is cooled to 10° C. by addition of ice. The coupler is precipitated by adding 48.1 parts of 80% acetic acid. Then a solution of 20 parts of a maleic acid-modified rosin ester in 168 parts of water and 27.3 parts of 25% strength sodium hydroxide solution are added and the pH is adjusted to 9.8 using 80% acetic acid.

c) Coupling

The diazo component is added to the coupler in one hour.

d) Addition of the Pigment Dispersant and of an Auxiliary 3.9 parts of C.I. Pigment Yellow 62 and 3.9 parts of hydrogenated tallowamine, dissolved in 50 parts of water with 6.4 parts of 80% acetic acid, are added. The mixture is then stirred at 80° C. for 17 hours. The suspension is filtered and the presscake is dried at 130° C.

e) Testing

Strongly colored prints are obtained in the FP system, with a clean hue, high gloss, and high transparency; the viscosity of the printing ink is low.

In the PVA system, strongly colored, transparent colorations of pure hue are obtained. This demonstrates the good dispersing properties.

EXAMPLE 2

Example 1 is carried out with the sole difference that 3.9 parts of C.I. Pigment Yellow 168 are used in place of the 3.9 parts of C.I. Pigment Yellow 62.

Strongly colored prints are obtained in the FP system, with a clean hue, high gloss, and high transparency; the viscosity of the printing ink is low.

In the PVA system, strongly colored, transparent colorations of pure hue are obtained. This demonstrates the good dispersing properties.

EXAMPLE 3

380 g of a commercial pigment P.Y.74 are mixed mechanically with 20 g of pigment dispersant P.Y.62.

The examples in the table below were carried out in the same way as for Example 3.

| Example | Amount of pigment dispersant in the pigment preparation |
|---|---|
| 3 | 5% P.Y.62 |
| 4 | 10% P.Y.62 |
| 5 | 2% P.Y.62 |
| 6 | 20% P.Y.62 |
| 7 | 0.1% P.Y.169 |
| 8 | 5% P.Y.169 |
| 9 | 10% P.Y.169 |

With Examples 3 to 9, strongly colored prints are obtained in the FP system, of high cleanliness, gloss, and transparency; the viscosity of the printing inks is low.

EXAMPLE 10

Synthesis of P.Y.62, Unlaked a) Diazo Component 109 parts of o-nitroaniline-p-sulfonic acid are suspended in 210 ml of water and 118 ml of 31% hydrochloric acid. The suspension is cooled to 4° C. with ice and diazotized with 65 ml of 40% strength sodium nitrite solution.

b) Coupler 1345 ml of water, 80 ml of 25% strength sodium hydroxide solution, and 95.5 g of acetoacetyl-o-toluidide are stirred for 1 h. The system is cooled to 10° C. with ice, and then the coupler is precipitated with 45 ml of 80% acetic acid. The pH is adjusted to 6.0 using acetic acid.

c) Coupling

The diazo suspension is added beneath the surface of the suspension of coupling material. The coupling suspension is filtered and the presscake is washed with water. This gives a 30% water-moist presscake of the unlaked P.Y.62.

EXAMPLE 11 a) Diazo Component 42 parts of 5-nitro-2-aminoanisole are suspended in 105 parts of water and 59 ml of 31% hydrochloric acid. The suspension is cooled to 0° C. with ice and diazotized by addition of 33 ml of 40% strength sodium nitrite solution.

b) Coupler and Pigment Dispersant 672 ml of water and 40 ml of 25% strength sodium hydroxide solution are used to dissolve 51.7 parts of acetoacetyl-o-anisidide. Following the addition of 1.8 parts of a 30% strength aqueous solution of sodium lauryl sulfate, the solution is cooled to 10° C. by addition of ice. The coupler is precipitated by addition of 22 ml of 80% acetic acid. The pH is adjusted to 6 to 7 with acetic acid. Then a solution of 10 parts of a maleic acid-modified rosin ester in 84 ml of water and 10.5 ml of 25% strength sodium hydroxide solution is added and the pH is adjusted to 9.8 with 80% acetic acid. 3.2 parts of a 30% water-moist presscake of unlaked P.Y. 62, produced in accordance with Example 10, are added.

c) Coupling

The diazo component is added to the coupler in one hour.

d) Addition of an Auxiliary and Laking of the Pigment Dispersant 4.8 parts of cocoamine are added. Then 0.3 part of calcium chloride, dissolved in 30 parts of water, is added.

The system is heated to 80° C. with steam and stirred at 80° C. for 17 hours. The suspension is filtered and the presscake is dried at 130° C.

Strongly colored prints are obtained in the FP system with a clean hue; the viscosity of the printing ink is low.

EXAMPLE 12 a) Diazo Component and Pigment Dispersant 42 parts of 5-nitro-2-aminoanisole are suspended in 105 parts of water and 59 ml of 31% hydrochloric acid. The suspension is cooled to 0° C. with ice and diazotized by addition of 33 ml of 40% strength sodium nitrite solution. 9.7 parts of a 30% water-moist presscake of unlaked P.Y. 62, produced in accordance with Example 10, are added.

b) Coupler 672 ml of water and 40 ml of 25% strength sodium hydroxide solution are used to dissolve 51.7 parts of acetoacetyl-o-anisidide. Following the addition of 1.8 parts of a 30% strength aqueous solution of sodium lauryl sulfate, the solution is cooled to 10° C. by addition of ice. The coupler is precipitated by addition of 22 ml of 80% acetic acid. The pH is adjusted to 6 to 7 with acetic acid. Then a solution of 10 parts of a maleic acid-modified rosin ester in 84 ml of water and 10.5 ml of 25% strength sodium hydroxide solution is added and the pH is adjusted to 9.8 with 80% acetic acid.

c) Coupling

The diazo component is added to the coupler in one hour.

d) Addition of an Auxiliary and Laking of the Pigment Dispersant 1.9 parts of a $C_{16}$-$C_{18}$ fatty alcohol with 25-molar ethoxylation and 1.6 parts of barium chloride, dissolved in 30 ml of water, are added. The system is heated to 80° C. with steam and stirred at 80° C. for 17 hours. The suspension is filtered and the presscake is dried at 130° C.

Strongly colored prints are obtained in the FP system with a clean hue and high gloss and transparency; the viscosity of the printing ink is low.

EXAMPLE 13 a) Diazo Component 42 parts of 5-nitro-2-aminoanisole are suspended in 105 parts of water and 59 ml of 31% hydrochloric acid. The suspension is cooled to 0° C. with ice and diazotized by addition of 33 ml of 40% strength sodium nitrite solution.

b) Coupler and Pigment Dispersant 672 ml of water and 40 ml of 25% strength sodium hydroxide solution are used to dissolve 51.7 parts of acetoacetyl-o-anisidide. 3.2 parts of a 30% water-moist presscake of unlaked P.Y. 62, produced in accordance with Example 10, are added. Following the addition of 1.8 parts of a 30% strength aqueous solution of sodium lauryl sulfate, the solution is cooled to 10° C. by addition of ice. The coupler is precipitated by addition of 22 ml of 80% acetic acid. The pH is adjusted to 6 to 7 with acetic acid. Then a solution of 10 parts of a maleic acid-modified rosin ester in 84 ml of water and 10.5 ml of 25% strength sodium hydroxide solution is added and the pH is adjusted to 9.8 with 80% acetic acid.

c) Coupling

The diazo component is added to the coupler in one hour.

d) Addition of an Auxiliary and Laking of the Pigment Dispersant 2.9 parts of dehydroabietylamine, dissolved in 15 ml of water and 1.0 ml of acetic acid, and 0.7 part of strontium chloride hexahydrate, dissolved in 10 ml of water, is added. The system is heated to 80° C. with steam and stirred at 80° C. for 17 hours. The suspension is filtered and the presscake is dried at 130° C.

Strongly colored prints are obtained in the FP system with a clean hue and high gloss and transparency; the viscosity of the printing ink is low.

EXAMPLE 14 a) Diazo Component 42 parts of 5-nitro-2-aminoanisole are suspended in 105 parts of water and 59 ml of 31% hydrochloric acid. The suspension is cooled to 0° C. with ice and diazotized by addition of 33 ml of 40% strength sodium nitrite solution.

b) Coupler 672 ml of water and 40 ml of 25% strength sodium hydroxide solution are used to dissolve 51.7 parts of acetoacetyl-o-anisidide. Following the addition of 1.8 parts of a 30% strength aqueous solution of sodium lauryl sulfate, the solution is cooled to 10° C. by addition of ice. The coupler is precipitated by addition of 22 ml of 80% acetic acid. The pH is adjusted to 6 to 7 with acetic acid. Then a solution of 10 parts of a maleic acid-modified rosin ester in 84 ml of water and 10.5 ml of 25% strength sodium hydroxide solution is added and the pH is adjusted to 9.8 with 80% acetic acid.

c) Coupling

The diazo component is added to the coupler in one hour.

d) Addition of pigment dispersant and auxiliary, and laking of the pigment dispersant 16.1 parts of a 30% water-moist presscake of unlaked P.Y. 62, produced in accordance with Example 10, are added. Then 4.8 parts of tallow propylenediamine and 1.8 parts of aluminum chloride, in solution in 30 parts of water, is added. The system is heated to 80° C. with steam and stirred at 80° C. for 17 hours. The suspension is filtered and the presscake is dried at 130° C.

Strongly colored prints are obtained in the FP system with a clean hue and high transparency; the viscosity of the printing ink is low.

EXAMPLE 15 a) Diazo Component 42 parts of 5-nitro-2-aminoanisole are suspended in 105 parts of water and 59 ml of 31% hydrochloric acid. The suspension is cooled to 0° C. with ice and diazotized by addition of 33 ml of 40% strength sodium nitrite solution.

b) Coupler 672 ml of water and 40 ml of 25% strength sodium hydroxide solution are used to dissolve 51.7 parts of acetoacetyl-o-anisidide. Following the addition of 1.8 parts of a 30% strength aqueous solution of sodium lauryl sulfate, the solution is cooled to 10° C. by addition of ice. The coupler is precipitated by addition of 22 ml of 80% acetic acid. The pH is adjusted to 6 to 7 with acetic acid. Then a solution of 10 parts of a maleic acid-modified rosin ester in 84 ml of water and 10.5 ml of 25% strength sodium hydroxide solution is added and the pH is adjusted to 9.8 with 80% acetic acid.

c) Coupling

The diazo component is added to the coupler in one hour.

d) Addition of pigment dispersant and laking of the pigment dispersant 6.4 parts of a 30% water-moist presscake of unlaked P.Y. 62, produced in accordance with Example 10, are added.

Then 3.1 parts of cocoalkyldimethylbenzylammonium chloride are added. The system is heated to 80° C. with steam and stirred at 80° C. for 17 hours. The suspension is filtered and the presscake is dried at 130° C.

Strongly colored prints are obtained in the FP system with a clean hue and high gloss and transparency; the viscosity of the printing ink is low.

EXAMPLE 16

Synthesis of P.Y.61 a) Diazo Component 109 parts of o-nitroaniline-p-sulfonic acid are suspended in 210 ml of water and 118 ml of 31% hydrochloric acid. The suspension is cooled to 4° C. with ice and diazotized with 65 ml of 40% strength sodium nitrite solution.

b) Coupler 1345 ml of water, 80 ml of 25% strength sodium hydroxide solution and 45 ml of 80% acetic acid are introduced as an initial charge and 88.6 g of acetoacetyl-o-anilide are sprinkled in. The pH is adjusted to 6.0 using acetic acid. The system is cooled to 15° C. with ice.

c) Coupling

The diazo suspension is added beneath the surface of the suspension of coupling material. The suspension is then stirred for 30 minutes, a solution of 66.6 g of calcium chloride in 150 ml of water is added, and the system is heated to 80° C. It is stirred at 80° C. for 1 hour. The coupling suspension is filtered and the presscake is washed with water. This gives a 38%, aqueous presscake of P.Y.61.

EXAMPLE 17 a) Diazo Component 42 parts of 5-nitro-2-aminoanisole are suspended in 105 parts of water and 59 ml of 31% hydrochloric acid. The suspension is cooled to 0° C. with ice and diazotized by addition of 33 ml of 40% strength sodium nitrite solution.

b) Coupler and Pigment Dispersant 672 ml of water and 40 ml of 25% strength sodium hydroxide solution are used to dissolve 51.7 parts of acetoacetyl-o-anisidide. Following the addition of 1.8 parts of a 30% strength aqueous solution of sodium lauryl sulfate, the solution is cooled to 10° C. by addition of ice. The coupler is precipitated by addition of 22 ml of 80% acetic acid. The pH is adjusted to 6 to 7 with acetic acid. Then a solution of 10 parts of a maleic acid-modified rosin ester in 84 ml of water and 10.5 ml of 25% strength sodium hydroxide solution is added and the pH is adjusted to 9.8 with 80% acetic acid. 12.7 g of an aqueous, 38% presscake of P.Y. 61, produced in accordance with Example 16, are added.

c) Coupling

The diazo component is added to the coupler in one hour.

d) Addition of the Pigment Dispersant and of an Auxiliary 1.9 parts of hydrogenated tallowamine, dissolved in 25 ml of water with 5 ml of 80% acetic acid, are added. The system is then stirred at 80° C. for 17 hours. The suspension is filtered and the presscake is dried at 130° C.

Strongly colored prints are obtained in the FP system with a clean hue and with high gloss and transparency.

EXAMPLE 18

Example 17 was repeated, with the sole difference that 4.8 g of a commercial P.Y.191:1 are used as pigment dispersant in place of the 12.7 g of an aqueous, 38% presscake of P.Y.61.

Strongly colored prints are obtained in the FP system, with a clean hue and high gloss; the viscosity of the printing ink is low.

The invention claimed is:

1. A method for pigmenting an electrophotographic toner, electrophotographic developer, ink, aqueous binder system or color filter comprising the step of adding to the electrophotographic toner, electrophotographic developer, ink, aqueous binder system or color filter a pigment preparation comprising C.I. Pigment Yellow 74 as base pigment and one or more pigment dispersants, wherein the one or more pigment dispersants are selected from the group consisting of C.I. Pigment Yellow 61, 61:1, 62, 62:1, 168, 169, and 191:1, or a combination of compounds of the formula (IV) and (V)

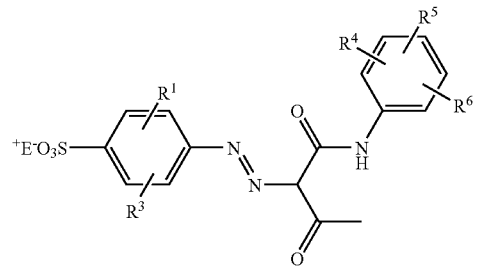

(IV)

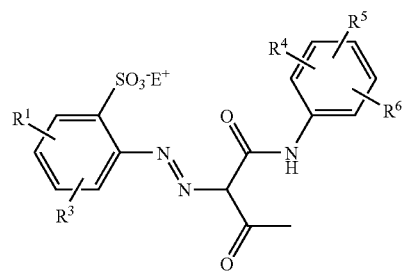

(V)

wherein $R^1$, $R^2$, $R^3$, $R^4$, $R^5$, and $R^6$ independently of one another are hydrogen, halogen, $C_1$-$C_4$ alkyl, $C_1$-$C_4$ alkoxy, nitro, trifluoromethyl, cyano, phenyl, $SO_3^-E^+$- or $COO^-E^+$, with the proviso that there is at least one and not more than two ionic groups of type $SO_3^-E^+$- or $COO^-E^+$, and that, in the case of two ionic groups, one ionic group is located in the $R^1$, $R^2$ or $R^3$ position and the other ionic group is located in the $R^4$, $R^5$ or $R^6$ position of the compounds of the formulas (IV) and (V);

$E^+$ is $H^+$; an equivalent metal cation $M^{m+}$, m being the number 1, 2 or 3;

a phosphonium ion; or an unsubstituted or substituted ammonium ion.

2. The method as claimed in claim 1, wherein $R^1$, $R^2$, $R^3$, $R^4$, $R^5$ and $R^6$ are hydrogen, chlorine, methyl, trifluoromethyl or methoxy.

3. The method as claimed in claim 1, wherein $E^+$ is $H^+$, $Na^+$, $Ca^{2+}$, $Mg^{2+}$, $Sr^{2+}$, $Ba^{2+}$, $Mn^{2+}$ or $Al^{3+}$.

4. The method as claimed in claim 1, wherein the pigment preparation further comprises:
   a) 50% to 99.9% by weight of Pigment Yellow 74,
   b) 0.1% to 25% by weight of 1, 2, 3, 4, 5 or 6 of the pigment dispersants,
   c) 0 to 25% by weight of at least one auxiliary,
the weight percentages of the respective components being based on the total weight of the preparation.

5. The method as claimed in claim 1, wherein the ink is an ink-jet ink.

6. The method as claimed in claim 5, wherein the ink-jet ink is a microemulsion ink, a solvent-based ink-jet ink or a hot-melt ink-jet ink.

7. The method as claimed in claim 1, wherein the ink is an aqueous printing ink.

8. The method as claimed in claim 1, wherein the pigment preparation is present in an amount of 0.05% to 30% by weight, based on the electrophotographic toner, electrophotographic developer, ink, aqueous binder system or color filter to be pigmented.

9. The method as claimed in claim 1, wherein the pigment preparation further comprises:
   a) 60% to 99.5% by weight of Pigment Yellow 74,
   b) 0.5% to 15% by weight of 1, 2, 3, 4, 5 or 6 of the pigment dispersants,
   c) 0 to 15% by weight of at least one auxiliary,
the weight percentages of the respective components being based on the total weight of the preparation.

10. The method as claimed in claim 1, wherein the pigment preparation further comprises:
    a) 60% to 99.5% by weight of Pigment Yellow 74,
    b) 0.5% to 15% by weight of 1, 2, 3 or 4 of the pigment dispersants,
    c) 0 to 15% by weight of at least one auxiliary,
the weight percentages of the respective components being based on the total weight of the preparation.

11. The method as claimed in claim 1, wherein the pigment preparation further comprises:
    a) 50% to 99.9% by weight of Pigment Yellow 74,
    b) 0.1% to 25 by weight of 1, 2, 3, or 4 of the pigment dispersants,
    c) 0 to 25% by weight of at least one auxiliary,
the weight percentages of the respective components being based on the total weight of the preparation.

12. The method as claimed in claim 1, wherein the aqueous binder system is an aqueous paint or aqueous varnish.

13. An electrophotographic toner, electrophotographic developer, ink, aqueous binder system or color filter made in accordance with the method of claim 1.

14. A method for pigmenting an electrophotographic toner, electrophotographic developer, ink, aqueous binder system or color filter comprising the step of adding to the electrophotographic toner, electrophotographic developer, ink, aqueous binder system or color filter a pigment preparation comprising C.I. Pigment Yellow 74 as base pigment and one or more pigment dispersants, wherein the one or more pigment dispersants are selected from the group consisting of C.I. Pigment Yellow 61, 61:1, 62, 62:1, 168, 169, and 191:1.

15. A pigmented electrophotographic toner, electrophotographic developer, ink, aqueous binder system or color filter made in accordance with the method of claim 14.

16. A method for pigmenting an electrophotographic toner, electrophotographic developer, ink, aqueous binder system or color filter comprising the step of adding to the electrophotographic toner, electrophotographic developer, ink, aqueous binder system or color filter a pigment preparation comprising C.I. Pigment Yellow 74 as base pigment and one or more pigment dispersants, wherein the one or more pigment dispersants are a combination of compounds of the formula (IV) and (V)

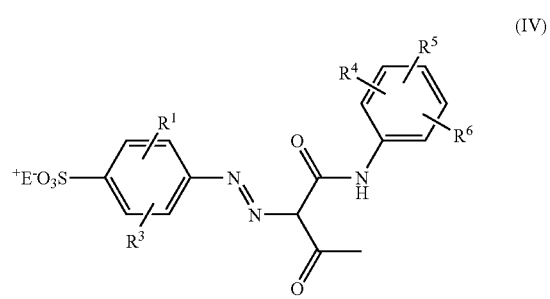

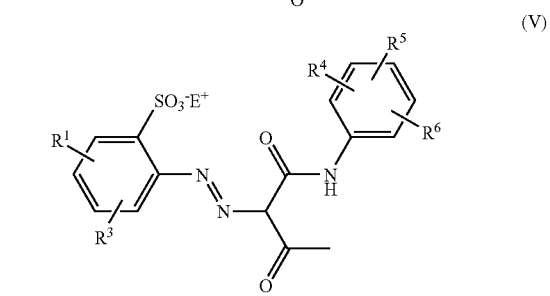

wherein $R^1$, $R^2$, $R^3$, $R^4$, $R^5$, and $R^6$ independently of one another are hydrogen, halogen, $C_1$-$C_4$ alkyl, $C_1$-$C_4$ alkoxy, nitro, trifluoromethyl, cyano, phenyl, $SO_3^-E^+$- or $COO^-E^+$, with the proviso that there is at least one and not more than two ionic groups of type $SO_3^-E^+$- or $COO^-E^+$, and that, in the case of two ionic groups, one ionic group is located in the $R^1$, $R^2$ or $R^3$ position and the other ionic group is located in the $R^4$, $R^5$ or $R^6$ position of the compounds of the formulas (IV) and (V);

$E^+$ is $H^+$; an equivalent metal cation $M^{m+}$, m being the number 1, 2 or 3;

a phosphonium ion; or an unsubstituted or substituted ammonium ion.

17. A pigmented electrophotographic toner, electrophotographic developer, ink, aqueous binder system or color filter made in accordance with the method of claim 16.

* * * * *